United States Patent [19]

Mitchell et al.

[11] Patent Number: 5,116,132
[45] Date of Patent: May 26, 1992

[54] RING LASER GYROSCOPE OUTPUT OPTICS DETECTION SYSTEM

[75] Inventors: Robert A. Mitchell, Woodland Hills; David B. Hall, La Crescenta; Kenneth W. Shafer, Thousand Oaks, all of Calif.

[73] Assignee: Litton Systems, Inc., Woodland Hills, Calif.

[21] Appl. No.: 464,164

[22] Filed: Jan. 12, 1990

[51] Int. Cl.$^5$ ............................................. G01B 9/02
[52] U.S. Cl. ............................................. 356/350
[58] Field of Search ................................. 356/350

[56] References Cited

U.S. PATENT DOCUMENTS

| | | | |
|---|---|---|---|
| 4,123,162 | 10/1978 | Sanders | 356/350 |
| 4,415,266 | 11/1983 | Matthews et al. | 356/350 |
| 4,429,997 | 2/1984 | Matthews | 356/350 |
| 4,449,824 | 5/1984 | Matthews | 356/350 |
| 4,652,132 | 3/1987 | Nelson et al. | 356/350 |
| 4,813,774 | 3/1989 | Dorschner | |
| 4,818,087 | 4/1989 | Dorschner | |
| 4,836,675 | 6/1989 | Hendow et al. | 356/350 |

OTHER PUBLICATIONS

Xicor-E$^2$POT TM Digitally Controlled Potentiometer.
National Semiconductor MICRO-DAC 1208, thru DAC 1210, DAC 1230 thru DAC 1232.

Primary Examiner—Linda J. Wallace
Attorney, Agent, or Firm—L. David Rish; M. Michael Carpenter

[57] ABSTRACT

A ring laser gyroscope output optics detection system, including a rotational sensing system and cavity length control system for a multioscillator ring laser gyroscope, is disclosed herein that can operate with a simple upright symmetric optics mechanism, where the required signal separation is performed fully electronically. In a preferred embodiment, signal separation circuitry is provided which performs a 90° or $\pi/2$ radians phase shift to one of a set of heterodyned signals in order to extract the sagnac effect modulated Faraday frequency signals $W_A$ and $W_B$. In order to deal with the inherent problems of crosstalk present in a Faraday biased system, alternative signal separation schemes suggest the use of a 45° or $\pi/4$ radians phase shift, as well as a 60° or $\pi/3$ radians phase shift. Complementary cavity length control schemes are presented in both fixed component and digitally controlled formats.

21 Claims, 7 Drawing Sheets

RING LASER GYROSCOPE OUTPUT OPTICS DETECTION SYSTEM

BACKGROUND OF THE INVENTION

1. Field of the Invention

This invention relates to ring laser gyroscope output optics detection systems, and more particularly, it relates to an output optics system for a multioscillator sensor which provides electronic separation of heterodyned Faraday bias difference frequency signals without the need for complex optical signal processing and components.

2. Description of the Related Art

The Ring Laser Gyroscope has been developed as a logical replacement for the mechanical inertial gyroscope. Based upon the principles of the Sagnac Effect, ideally the ring laser gyroscope has minimal moving parts allowing extremely accurate rotational sensing. As originally envisioned, the ring laser gyroscope has at least two counter-propagating electromagnetic waves (such as light) which oscillate within an optical ring cavity. When the ideal ring laser gyroscope is stationary, no rotation is indicated by the sensor. As the ring cavity of the laser gyroscope is rotated about its central axis, the counter-propagating waves interact so that a beat frequency is developed. A linear relationship between the beat frequency and the rotation rate of the gyroscope with respect to the inertial frame of reference may be established.

Although the ideal ring laser gyroscope is characterized by a beat note proportional to the rotational rate, the two mode planar ring laser gyroscope requires rate biasing or mechanical dithering to prevent counter propagating waves from locking at low rotation rates. In an effort to solve this lock-in problem, non-planar multioscillator ring laser gyroscopes have been developed, having more than one pair of counter propagating modes. Briefly, the basic multi-oscillator ring laser gyroscope operates with left circularly polarized (LCP) and right circularly polarized (RCP) light beams and uses a Faraday effect glass device within the cavity or magnetic field on the gain plasma to provide a phase shift between the counter-propagating waves to prevent mode locking. An example of this theory of multioscillator ring laser gyroscope may be found in U.S. Pat. No. 4,818,087 entitled "ORTHOHEDRAL RING LASER GYRO" issued Apr. 4, 1989 to Raytheon Corporation (Terry A. Dorschner, inventor); and U.S. Pat. No. 4,813,774 entitled "SKEWED RHOMBUS RING LASER GYRO" issued Mar. 21, 1989 to Raytheon Corporation (Terry A. Dorschner, et. al., inventor).

In either of these laser gyroscope systems, it is necessary to extract a portion of each beam propagating within the laser cavity to produce two output signals, each one of which represents the difference in frequency between wave pairs having the same sense of polarization within the cavity. For example, in planar ring laser gyroscope systems, rotational information is obtained by monitoring the oppositely directed waves. In the ideal case of a uniformly rotating laser, the frequencies of the waves are slightly different.

The planar gyroscope has a device for combining its oppositely directed beams to obtain a read out which includes a dielectric mirror mounted on one side to the ring laser gyroscope body. Mounted to the opposite surface of the mirror, a prism assembly (which preferably may be an upright symmetric prism) is used to form a fringe pattern. The prism is directly mounted to the mirror to minimize vibrations.

In the planar gyroscope output optics, the fringes are a measure of the instantaneous phase difference between the oppositely directed beams. For the case when the intensities are matched and counter propagating beams are nearly collinear, the fringe pattern is stationary. When the laser gyroscope is rotated, the fringe pattern moves at the beat frequency rate. If the fringe spacing is considerably larger than the dimensions of a photodetector, a measurement of the rotation rate can be made by simply recording the rate at which the intensity maximum moves past the detectors.

The direction in which the fringe pattern moves past the detectors determines the sense of rotation. By using two detectors spaced at 90°, or a quarter fringe apart, and a logic circuit, both positive and negative counts can be accumulated to give rotation rate and sense. It should be noted that with this type of readout, the laser gyroscope is inherently an integrating rate gyroscope with a digital output. Thus, with up-down counting, the net number of accumulated counts depends only on the net angle through which the ideal gyroscope is rotated. One complete revolution of a typical gyroscope would produce on the order of $10^6$ counts. In summary, the output optics detection system for the planar ring laser gyroscope is relatively straight forward.

The same cannot be said for the multioscillator ring laser gyroscope. Multimode ring laser gyroscopes as known in the art may employ optical crystals and Faraday effect devices to shift the frequency of the laser beams. Heretofore, the biasing and detection schemes which have been proposed have been unduly complex and have had high noise levels associated with them. This was acknowledged as early as 1977 in U.S. Pat. No. 4,123,162 issued to Sanders and assigned to the common assignee of this application. In order to solve the problem of biasing and detecting output signals from a multioscillator ring laser gyroscope, the Sanders '162 patent was directed to a scheme of rotation direction determination through a circuit which dithered the laser plasma current, and used the AC component from the plasma power supply as a phase standard for detecting the sign or direction of rotation of the ring laser gyroscope. Sanders '162 superimposes a differential AC dithering voltage onto the DC voltage of the plasma power supply. A phase reference voltage is synchronized with the AC dither of the plasma and is applied to the synchronous demodulator 78 of Sanders '162. A slight change in the plasma current reduces one beat frequency (characteristic of one gyroscope contained within the multioscillator) and increases another beat frequency. The Sanders circuitry determines the direction of rotation by determining whether the signal is in phase or out of phase with the phase reference signal. Sanders '162 uses a single photodetector to achieve its rotation rate and rotation sense measurements. Sanders '162 also discloses a maximum intensity seeking path length control servo which is not easily adaptable into most multioscillators used due to the complex nature of the intensity curves exhibited in such a scheme.

Another scheme for rotation rate and rotational direction sensing is disclosed in the following U.S. Pat. Nos.: 4,415,266; 4,429,997; and, 4,449,824, all issued to Matthews, Patent '266 and patent '997 are directed to a phase-locked loop system for a multioscillator ring laser gyroscope, while the '824 patent is directed to the structure of the output optics. A complex output optics detector prism structure is disclosed by Matthews, which includes three mirrors (22, 40, and 41), a beamsplitter (42), a set of quarter-wave plates (43 and 53), a set of polarizers (44 and 54), and a set of detector diodes (45 and 55) (as shown in FIG. 2 of the U.S. Pat. No. 4,449,824 ). The electronic signal processing systems disclosed in the '266 and '997 patents are used to process the heterodyned optical output signals provided by complex optics as discussed in the '824 patent. The Matthews' patents are all directed to an overall system which requires complex optics to separate the Sagnac effect modulated Faraday frequencies. Matthews employs a path length control system which compares the optical intensity of the separated signals to produce a path length control error signal. The problems which arise when using complex output optics (besides the difficulty of manufacturing a bulky mechanical structure and optical alignment) include severe optical signal attenuation, and measurement accuracy problems associated with optical signal backscatter. It therefore is desirable to provide an output optics structure and system which is free from the confinement of complex optical signal processing.

One attempt to simplify the output optics system is disclosed is U.S. Pat. No. 4,836,675, issued Jun. 6, 1989 (Martin and Hendow, inventors) and assigned to the common assignee of this application. In this case, the applicants used straight forward optics (similar to the output optics used in a dithered planar ring laser gyroscope system) and rather complex electronics to achieve the goal of measuring rotation rate and sense, as well as achieving cavity length control, in a multioscillator ring laser gyroscope system. The system that U.S. Pat. No. 4,836,675 discloses for cavity length control attempts to discriminate the amount of envelope modulation depth to determine the gyroscope's operating point, using no additional photodetectors than what is required for a planar gyroscope; however, the proposed electronic system for processing the optical output signals are rather complex, and therefore subject to signal degradation and noise, as well as higher cost implementation.

SUMMARY OF THE INVENTION

It appears from a discussion of the related Art in the Background of the Invention that a multi-oscillator ring laser gyroscope output optics detection system is needed which will separate the pairs of signals derived from the optical signals in the gyroscope cavity using straight forward output optics prism and electronics.

An invention is disclosed which is directed to a multi-oscillator ring laser gyroscope rotational sensing system which comprises an output prism, affixed to an output mirror of a ring resonator cavity of a ring laser gyroscope, suitable for heterodyning multiple frequency optical signals (producing a heterodyned double side band suppressed carrier optical output signal which is a function of a Sagnac effect modulated Faraday biased beat frequency signal, in the form of a double side band suppressed carrier modulation signal); a photoelectronic transducer device that is capable of electronically detecting the heterodyned optical output signal from the output prism; and, signal separation circuitry for processing an electronic output signal corresponding to the heterodyned double side band suppressed carrier optical output signal from the prism. Such signal separation circuitry is suitable for detection both the rate and sense of rotation electronically, without the need for complex output optics, thereby avoiding significant signal attenuation.

In addition to the rotation sensing function, the gyroscope rotational sensing system may include a cavity length control system, operatively associated with the signal separation circuitry, for controlling the resonance of a signal within the ring resonator cavity of the ring laser gyroscope. Such a cavity length control system would include a broadband signal processing circuit for maintaining a proper cavity length operating point over a wide range of gyroscope rotation rates. The broadband signal processing circuit would have predictable behavior of relative amplitudes of the separated signals over a predetermined maximum frequency range, which range approaches the theoretical maximum rotation rate of the instrument. Also, associated with such a cavity length control system is a sub-system for further reduction of the effect of crosstalk on the pathlength error signal, when gyroscope operation occurs near zero rotation rate, as the gyroscope operation relates to a cavity length servo-mechanism.

In a preferred embodiment, the photo-electronic transducer device may include a set of at least two photodetectors separated a predetermined phasor distance apart. In further detail, the signal separation circuitry would include a set of at least two phase shifter circuits, one of each the phase shifter circuits operatively associated with one of each of the photodetectors, each of the phase shift circuits operating to phase shift the suppressed carrier modulation electronic output signal. The detailed signal separation circuitry would also include a set of at least two combining circuits, one of each combining circuit combining a first suppressed carrier modulation electronic output signal from a first photodetector with a phase-shifted second suppressed carrier modulation electronic output signal from a second photodetector; and, a second of the two combining circuits combining a second suppressed carrier modulation electronic output signal from a second photodetector with a phase-shifted first suppressed carrier modulation electronic output signal from a first photodetector. In this manner, the double side band suppressed carrier modulation signal from the photodetectors is electronically separated into two component output signals, corresponding to each of the Sagnac effect modulated Faraday biased beat frequency signals, in order to measure rotational rate and direction.

In further detail, the cavity length control circuitry would include a detector circuit for determining a time-averaged magnitude values for each of the separated component output signals, the detector circuit providing these magnitude values to a difference amplifier. The difference amplifier would then provide an output error signal. This output error signal from the difference amplifier would be integrated (forming a servo-loop) for feeding an integrated error signal to at least one piezo-electric transducer, at a level sufficient to drive the piezo-electric transducer. In this manner, cavity length may be adjusted.

In an alternative embodiment, cavity length control and rotational sensing may be achieved by use of at least two digitally controlled phase shifting circuits. One of each of the digitally controlled phase shifting circuits may be operatively associated with one of each of the two photodetectors, each one of the digitally controlled phase shifting circuits operating to selectively adjust a first and a second suppressed carrier modulation electronic output signal. The digitally controlled phase shifting circuits selectively adjust the first and second suppressed carrier modulation electronic output signals according to an integrated error signal output from the cavity length control circuitry. Associated with the phase shifters are multiplexer circuits which multiplex the two separated component output signals from the digitally controlled phase shifting circuits. A magnitude detector (associated with the multiplexer circuits) determines time averaged magnitude values for each of the separated component output signals. This detector provides the magnitude values to an analog-to-digital converter. This analog-to-digital converter provides an error signal to a computer. The computer digitally processes the error signal from the analog-to-digital converter (forming a servo-loop), and feeds a first digitally processed output error signal (through a digital-to-analog converter) to at least one piezo-electric transducer (at a level sufficient to drive the piezo-electric transducer). The computer also feeds a second digitally processed output error signal directly to each of the digitally controlled phase shifting circuits, whereby the cavity length may be adjusted and signal separation and rotation measurement achieved avoiding crosstalk between the signal separation circuitry and the cavity length control circuitry. In this manner, the two component output signals (corresponding to each of the Sagnac effect modulated Faraday biased beat frequency signals, in order to measure rotational rate and direction) are derived, adaptively filtered by the digitally controlled phase shifting circuits in order to avoid crosstalk with the integrated error signal output from the cavity length control circuitry.

The phase shifter circuits used by the signal separation circuitry of the preferred embodiment may include two RC networks, operatively associated with a common voltage divider network. Each of the RC networks may be connected in series to one input of each of the combining circuits. The combining circuits are differential amplifiers. In this manner, a first input signal to the signal separation circuitry is phase shifted $\pi/4$ radians in a first RC network, and a second input signal to the signal separation circuitry is phase shifted $\pi/4$ radians in a second of the RC networks. Half of each of the first and second input signals are subtracted from the phase shifted $\pi/4$ version at the differential amplifiers, resulting in a $\pi/2$ radian phase shift of the first input signal at half of the first input signal's amplitude and a $\pi/2$ radian phase shift of the second input signal at half of the second input signal's amplitude. The first and second input signals are thereby separated into their respective components allowing determination of gyroscope rotation and rotational direction.

Alternatively, the two phase shifter circuits may include two RC networks, each RC network operatively associated with both of the photodetectors. Each of the RC networks are cross coupled to one another and connected in series to one input of each of the combining circuits. The combining circuits in this alternative embodiment are buffer amplifiers. This alternative embodiment operates such that a first input signal to the signal separation circuitry is phase shifted by a $\pi/4$ radians lead by a first and second of the RC networks, and a second input signal to the signal separation circuitry is phase shifted by a $\pi/4$ radians lag by the first and second of the RC networks. In this manner, a $\pi/2$ radians of resultant shift is introduced into each of a first and second buffer amplifier input signals. These first and second buffer input signals are separated into their respective components allowing determination of gyroscope rotation and rotational direction. Alternatively, the two RC networks may be operatively associated with both cross coupled capacitors and a common voltage divider network, so that maximum crosstalk cancellation may be achieved by cancellation of unwanted signals over a wide range of signal crosstalk.

In order to obtain the desired unwanted signal cancellation over an extended range of up to 180% frequency difference between the input optical signals, an adjustable capacitor may be operatively associated with each of the RC networks so that this RC network may be interactively tuned for such an extended range.

The two photodetectors which make up the photoelectronic transducer may be positioned along the same side of the output prism for detecting the heterodyned carrier optical output signal; or, the photodetectors may be positioned on opposite sides of the output prism. A set of current-to-voltage converters, each in close proximity to each of the photodetectors, may be used.

A method for output optics detection in a ring laser gyroscope rotational sensing system is taught by this invention. The first step in this method includes heterodyning multiple frequency optical signals in the form of double sideband suppressed carrier modulation signals, by using an output prism, affixed to an output mirror of a ring resonator cavity of a ring laser gyroscope. (The signals are grouped into pairs, each pair of signals having a clockwise component and an anti-clockwise component.) The optical signals are then converted to electronic signals by use of a pair of photo-electronic transducers.

The optical signals are processed through the signal separation circuitry, producing an electronic output signal corresponding to the double side band suppressed carrier modulation signals where the output signal is a function of a Faraday bias difference beat frequency signal. By this process, the Sagnac effect modulated Faraday biased beat frequency signal is electronically separated into its components in order to measure rotational rate and direction. To achieve cavity length control, this method may include the additional steps of controlling the cavity length of the ring laser gyroscope by feeding back cavity length drive signals to piezoelectric elements located on a plurality of mirrors of the ring laser gyroscope. These cavity length drive signals are derived from the separation of the suppressed carrier modulation signals by the signal separation circuitry.

In addition to the specialized signal separation circuitry and cavity length control servo-mechanism taught for the specialized use of a ring laser gyroscope, a generalized signal separation circuit, for separating a double side band suppressed frequency signal into its components, is taught in this application. This generalized separation circuit includes a set of at least two digitally controlled phase shifting circuits. A set of at least two input source nodes providing a first and second version of the double side band suppressed carrier signal to the two digitally controlled phase shifting circuits is also provided (the input source nodes correspond to the outputs of the photodetectors of the ring laser qyroscope). The first and second versions of the double side band suppressed carrier signal are phase shifted with respect to one another by a predetermined phase. A transducer control circuitry is also provided which is operatively associated with the digitally controlled phase shifting circuits, for controlling signals activating at least one transducer. Each one of the two digitally controlled phase shifting circuits are operatively associated with one of the two input source nodes, each one of the digitally controlled phase shifting circuits operating to selectively adjust a first and a second double side band suppressed carrier output signal. The digitally controlled phase shifting circuits then selectively adjusts the first and second suppressed carrier modulation electronic output signals according to an integrated error signal output from the transducer control circuitry. The generalized separation circuitry derives two component output signals which are adaptively filtered by the digitally controlled phase shifting circuits in order to avoid crosstalk with the integrated error signal output from the transducer control circuitry. The signal separation circuit for separating a double side band suppressed carrier signal into its components may also include a multiplexer for multiplexing the two separated component output signals from the digitally controlled phase shifting circuits. Time-averaged magnitude values for each of the separated component output signals are then derived by a detecting circuit. The detecting circuit provides the magnitude values to an analog-to-digital converter. The analog-to-digital converter then provides an error signal to a computer.

The computer digitally processes the error signal from the analog-to-digital converter (forming a servo-loop). The error signal is feed through a digital-to-analog converter, where a first digitally processed output error signal to the piezo-electric transducer (at a level sufficient to drive the piezo-electric transducer) is derived. The computer also feeds a second digitally processed output error signal from the computer directly to each of the digitally controlled phase shifting circuits. Thus, the piezoelectric transducer may be activated and signal separation achieved avoiding crosstalk between the signal separation circuitry and the transducer control circuitry.

In this manner, a versatile and fully electronic optical output signal detection system is disclosed which provides rotational sensing and rate information, as well as data useful for cavity length control.

DETAILED DESCRIPTION OF THE PREFERRED EMBODIMENT

Figures 1, 2A, 2B, 2C:
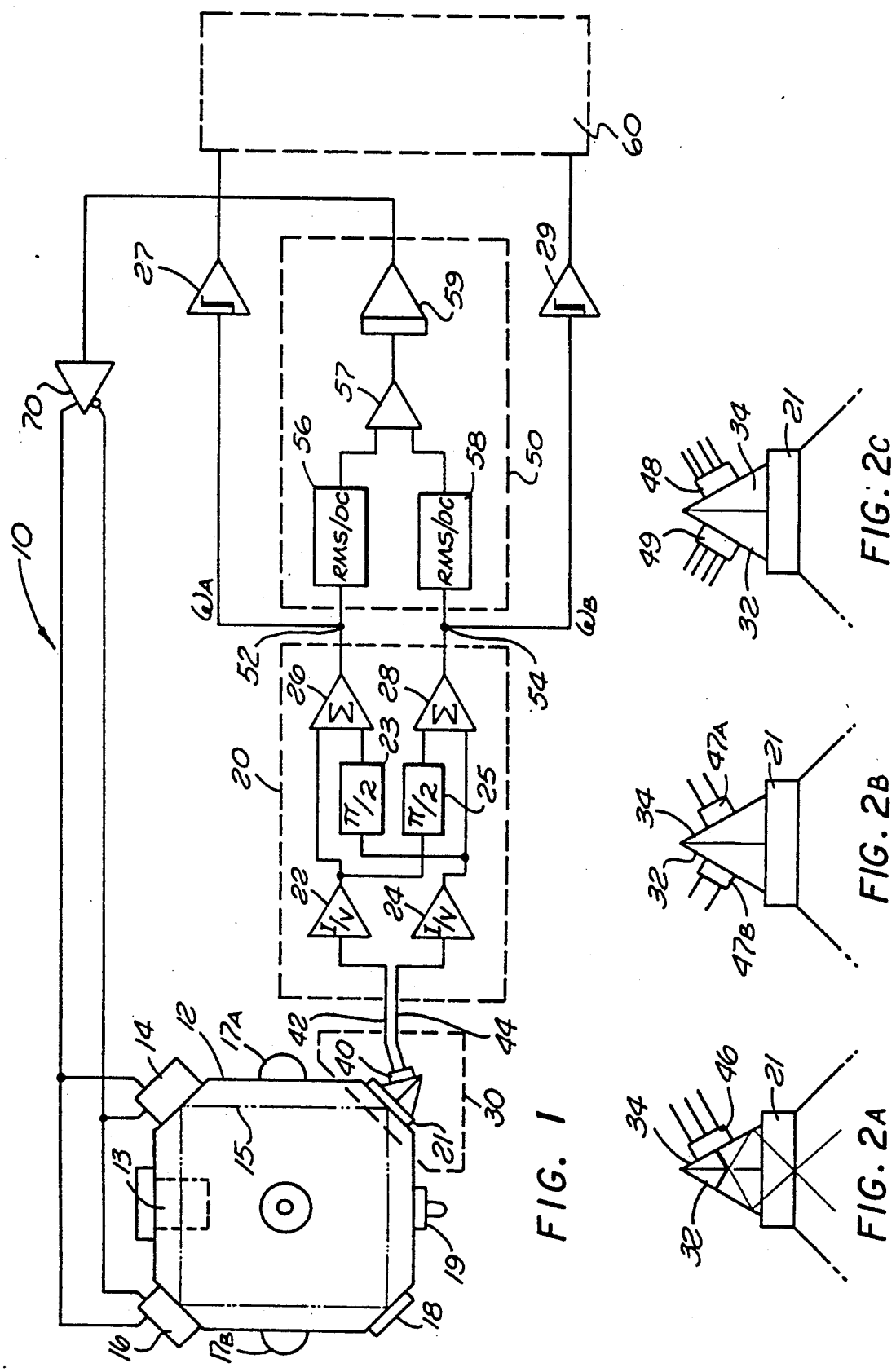
FIG. 1 is a schematic diagram of a preferred embodiment of the output optics detection and cavity length control system of this invention.
FIG. 2A is a side view of the mechanical construction of the output optics prism of a preferred embodiment of the output optics detection system of this invention; and, associated photodetectors mounted onto the prism. The photodetector pair could have current-to-voltage converters integrated into the package with them.
FIG. 2B is a side view of the mechanical construction of the output optics prism of an alternative embodiment of the output optics detection system of this invention; and, associated photodetectors mounted onto the prism.
FIG. 2C is a side view of the mechanical construction of the output optics prism of yet another alternative embodiment of the output optics detection system of this invention; and, associated photodetectors and optional integrated current-to-voltage converters mounted onto the prism.

With reference to FIG. 1, there is disclosed an output optics detection system 10 for detecting and decoding the optical signal rotational and rate information provided by the upright symmetric prism assembly 36 of the multioscillator ring laser gyroscope. The multioscillator ring laser gyroscope is comprised of a monolithic block or frame 12 made from a single material glass such as ZERODUR made by Schott of West Germany. The frame contains an optical pathway 15 defined by four corner mirrors 14, 16, 18, and 21. An active medium of excited Helium-Neon Gas is provided by activation of the anode 19 and cathodes 17A and 17B. (An alternative configuration, not shown, comprising a single cathode positioned between two anodes is also operable.) Reciprocal splitting of the light beams travelling along the optical pathway 15 is provided by the nonplanar geometry of the gyroscope, providing left and right reciprocal circularly polarized light (RCP) and (LCP). (The nonplanar configuration is achieved by folding the optical pathway 15 along an imaginary fold line (not shown) connecting opposing corner mirrors 14 and 18.) A Faraday rotator assembly 13 provides non-reciprocal splitting between clockwise and anti-clockwise components of each set of LCP and RCP light. This nonreciprocal splitting is on the order of one megahertz (1 Mhz). The readout optics prism system 30 is comprised of a pair of upright symmetric prisms 32 and 34 joined in such a fashion to produce the single upright symmetric prism assembly 36 and mounted upon partially transmitting mirror 21; and, a set of photodetectors 40. The common vertical surface between prisms 32 and 34 reflects 50% of the incident light and the opposite diagonal surfaces on each prism 32 and 34 have reflective areas adjacent to a photodetector.

The preferred arrangement for aligning the photodetectors, as photodetector 40 of FIG. 1, is shown in FIG. 2A because matching of such monolithic devices is nearly ideal over temperature and the free surface can be used for gyroscope diagnostics after assembly. In an alternative embodiment as shown in FIGS. 2B, a pair of photodetectors (47A and 47B of FIG. 2B) can be used, instead of a dual photodetector 46 mounted on one surface of the prism 34 as in FIG. 2A. The Configurations of the photodetectors 47A, 47B, on both diagonal surfaces of prisms 32 and 34, as shown FIG. 2B, allow independent alignment which in some applications (such as obtaining non-quadrature amplitude balanced outputs) may be desirable. It is understood that with regard to the embodiments shown at FIGS. 2B and 2C, both detectors 47A and 47B must receive only part of the beam energies incident thereupon in order to provide controllable phase-shifted signals to the signal separation circuitry 20. This may be accomplished by misaligning the detectors 47A and 47B of FIGS. 2B and 2C.

The signal separation circuitry 20 shown in FIG. 1 is an idealized functional embodiment which performs the same function that has been previously been accomplished using stacked quarterwave plates and optical polarizers. The temperature stability and alignment problems with the prior art optical stack are significant drawbacks of such a scheme, making the embodiment shown in FIG. 1 preferable as an all electronic system. The idealized functional embodiment shown in FIG. 1 is practiced according to the exemplary embodiments shown in FIGS. 3A-3D, and FIG. 8, to achieve a temperature stable, easily-aligned signal separation means capable of extracting the frequency differences between counter-propagating light beams in the gyroscope cavity. This frequency difference is a function of the amount of Faraday rotation produced by the Faraday rotator assembly 13 in the cavity and the rotation rate of the gyroscope. In general, the frequencies present at the circuit outputs ($W_A$ and $W_B$ in FIGS. 1, 3A-3D, and 8) will be identical at zero rotation rate. A rotation rate other than zero causes one output (for example, $W_A$) to become higher and the other ($W_B$) to become lower. Higher rotation rates produce proportionally greater frequency differences between outputs. Reversing the rotation direction causes $W_B$ to become the higher frequency. Ideally there is only a single frequency present on each output at any particular rotation rate. If optical misalignment of photodetectors is present or the components in the circuit are not optimal values a composite of the two frequencies will be present at one or both outputs. This is observed as amplitude modulation of the outputs at a frequency equal to the difference in the two frequencies (the beat note). Furthermore, high rotation rates produce a similar result even if amplitude modulation is absent at near zero rate. Fortunately, this last phenomenon is predictable in its behavior and can be accommodated.

In order to understand the function of circuits shown in FIGS. 1, 3 and 8, it is helpful to formulate equations for current from the photodetectors depicted in [FIG. 4A] as follows:

$$i_{PD1} = SIN\ W_A t + SIN\ W_B t \qquad EQ\ 1$$

$$i_{PD2} = SIN\ (W_A t - \pi/2) + SIN(W_B t + \pi/2) \qquad EQ\ 2$$

Where $W_A$ is the beat frequency produced by the right circularly polarized counter-propagating beams in the gyroscope cavity and $W_B$ is the corresponding left circularly polarized component.

Signals $i_{PD1}$ and $i_{PD2}$ are presented to the signal separation circuitry along the input terminals 42 and 44, leading away from the photodetectors 40. A feature common to all embodiments is current-to-voltage converters 22 and 24 associated with each photodetector [FIG. 1]. The signals ($i_{PD1}$ and $i_{PD2}$) are thereby presented to the I/V (Current-to-Voltage) converters 22 and 24 for further processing as voltage signals. The I/V converters could also be collocated with the photodetectors. (Strictly speaking, it is not necessary to convert photodetector current to voltage but the mutual loading caused by the various phase shift networks makes the direct approach extremely interactive with regard to tuning. When working with voltage sources as shown here, each output may be optimized separately.) These signals (along the electrical pathways leading through terminals 42 and 44) represent an electronic analog of, and correspond to, the optically heterodyned output signal present at the diagonal surface of the upright symmetric prism and mirror assembly 30.

Figure 6:
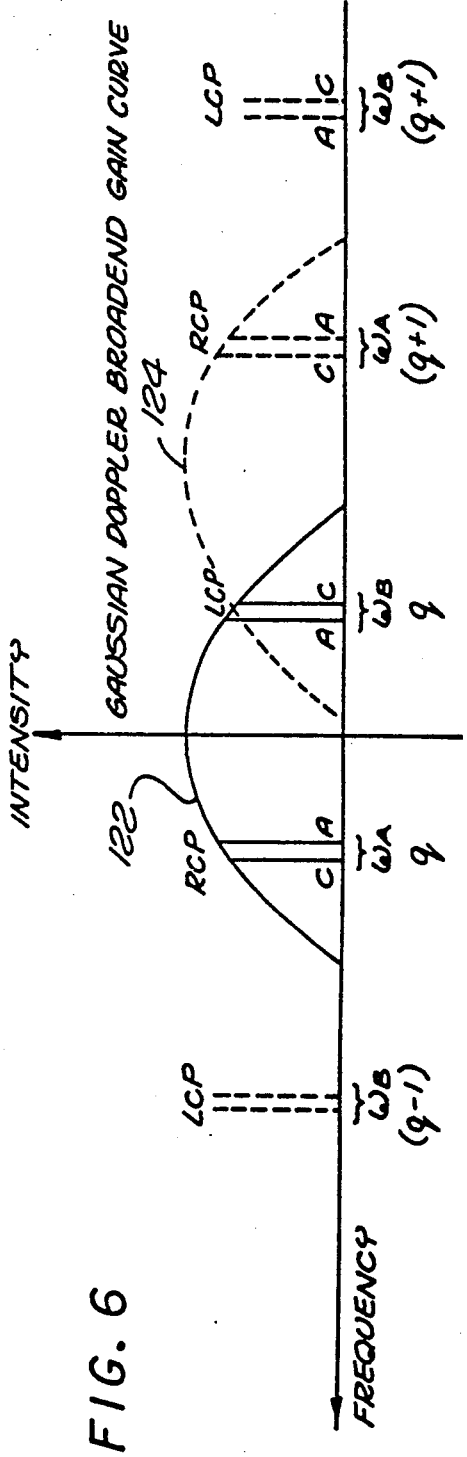
FIG. 6 is a graphic illustration of the ring laser gain curve characteristics of the resonant optical pathway showing the relationship between various operating points and readout signals with respect to the associated laser gain curve.

It is a function of the present invention to electronically separate the $W_A$ and $W_B$ frequencies so that a digital number or other signal representing the present rate of rotation experienced by the ring laser gyroscope may be obtained. In order to produce the signals representing the amount of rotation experienced by the ring laser gyroscope, it is necessary to derive signals $W_A$ and $W_B$ representing the differences in frequency between the cavity waves of one circular polarization (RCP) and the difference in frequency in the other circular polarization waves (LCP). The relationships of these signals to the gyroscope doppler broadened gain curve is shown in FIG. 6. Curve 122 shows the gaussian broadened gain curve of the primary longitudinal mode (the q,q mode). Signals $W_A$ and $W_B$ are shown in FIG. 6 to be the difference signals between clockwise (C) and anti-clockwise (A) non-reciprocal components of the Left Circularly Polarized and Right Circularly Polarized reciprocally split frequencies within the multioscillator cavity. The positioning of the observable $W_A$ and $W_B$ are shown to be reversed in the (q, q+1) longitudinal mode, as shown by the dashed curve 124. Except for the frequencies $W_A$ and $W_B$ shown in FIG. 6, all other beat frequencies between the right and left circular polarized components exist at such high frequencies (hundreds of megahertz typically) that the photodetectors will not respond to them. Even if the photodetectors could respond to these high frequencies, they can be readily filtered out.

The heterodyned signals proceed through the signal separation circuitry 20 from the output of the converters 22 and 24 to the electronic phase shifters 23 and 25 and the summing amplifiers 26 and 28. The phase shifters each shift one of the two heterodyned signals from the output of the converters 22 and 24, presenting their output signals to an input terminal of each of the summing amplifiers 26 and 28. Each heterodyned signal is also presented with no phase shift to an input of terminal of each summing amplifier 26 and 28. Each of the summing circuits then processes their respective input signals as follows:

The $\pi/2$ radian phase shifts in $i_{PD2}$ [EQ 2 above] results from the optical configuration of the gyroscope cavity and readout optics (the photodetector currents will be formulated as voltages for the purposes of this discussion, since these currents are converted to voltages by the converters 22 and 24). If $V_{PD1}$ is phase shifted by $\pi/2$ radians and added to $V_{PD2}$, one obtains the following:

$$V_{PD1} < -\pi/2 + V_{PD2} = \mathrm{SIN}(W_A t - \pi/2) + \mathrm{SIN}(W_B t - \pi/2) + \mathrm{SIN}(W_A t - \pi/2) + \mathrm{SIN}(W_B t + \pi/2)$$
$$= +\mathrm{COS} W_A t + \mathrm{COS} W_B t + \mathrm{COS} W_A t - \mathrm{COS} W_B t$$
$$= +2\mathrm{COS} W_A t$$
[EQ 3]

Thus, only the $W_A$ frequency term survives the operation and the signal processing at the output terminal 52 of the separation circuitry 20 of FIG. 1. Likewise, one can phase shift $V_{PD2}$ by $\pi/2$ radians and one obtains the following:

$$V_{PD1} + V_{PD2} < -\pi/2 = \mathrm{SIN} W_A t + \mathrm{SIN} W_B t + \mathrm{SIN}(W_A t - \pi/2 - \pi/2) + \mathrm{SIN}(W_B t + \pi/2 - \pi/2)$$
$$= \mathrm{SIN} W_A t + \mathrm{SIN} W_B - \mathrm{SIN} W_A t + \mathrm{SIN} W_B t$$
$$= +2\mathrm{SIN} W_B t$$
[EQ 4]

And here only the $W_B$ term survives. This describes mathematically the signal separation achieved by the idealized functional embodiment shown in FIG. 1. It may be noted that the output signals from terminals and 54 are provided to the Digitizers 27 and 29 where the signals are converted to a digital count capable of being interpreted and read by the computer 60. The result of this process yields an electronic equivalent of the optical separation approach used in the prior art (such as described in the Matthews U.S. Pat. No. 4,449,824 previously described) for right and left circular polarized beams.

Figure 3A:
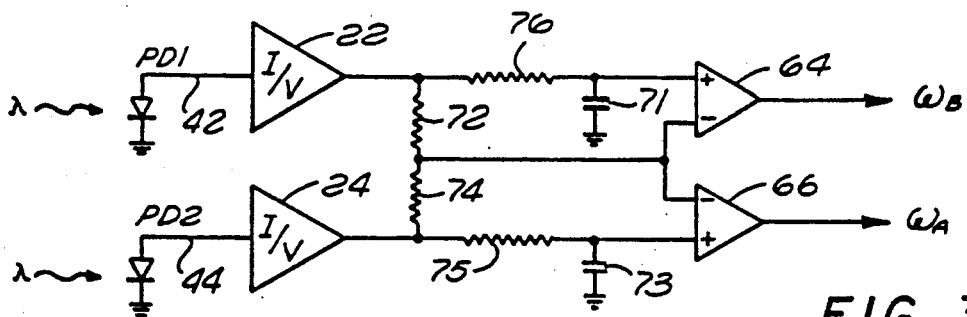
FIG. 3A is an embodiment of the detailed circuitry of the separation circuit 20 shown in FIG. 1.
Figure 3B:
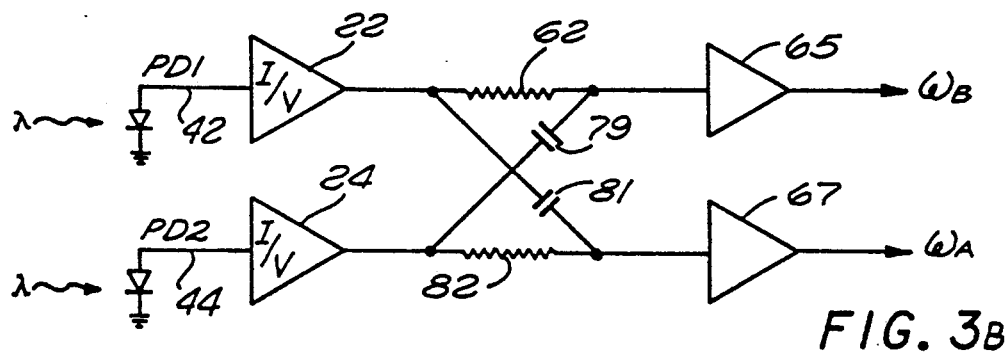
FIG. 3B is an alternative embodiment to the detailed circuitry shown in FIG. 3A, which functions like the separation circuit 20 shown in FIG. 1.
Figure 3C:
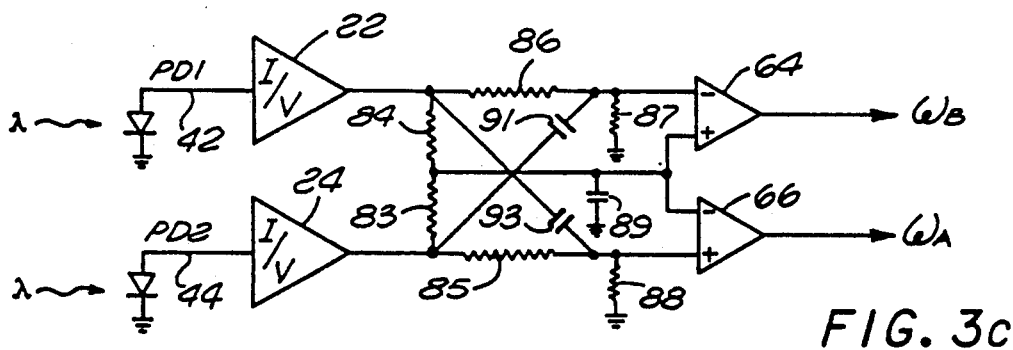
FIG. 3C is yet another alternative embodiment to the detailed circuitry shown in FIG. 3A, which functions like the separation circuit 20 shown in FIG. 1.
Figure 3D:
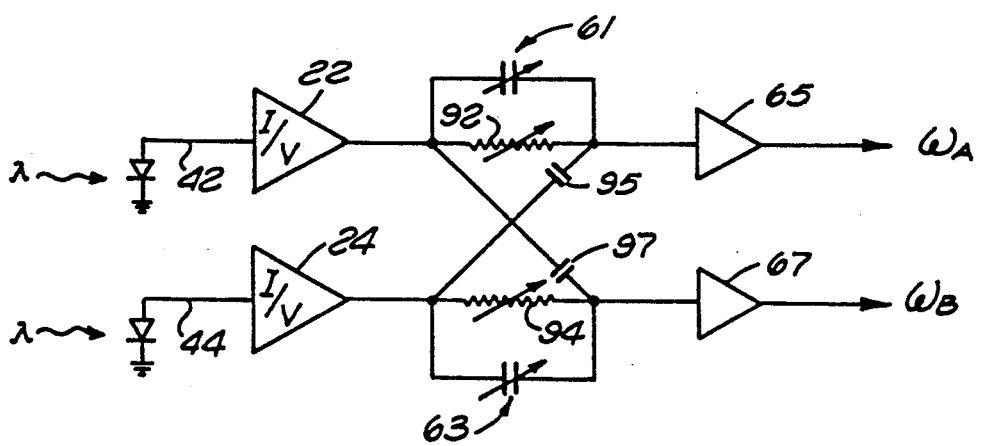
FIG. 3D is still another alternative and preferred embodiment to the detailed circuitry shown in FIG. 3A, which functions like the separation circuit 20 shown in FIG. 1.
Figure 4A:
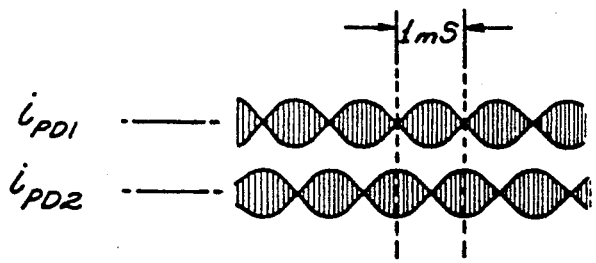
FIG. 4A shows a graphic representation of the waveforms of the heterodyned electronic output signal from the photodetectors 40 of the output prism 36 of FIG. 1, as these signals are presented to the input terminals 42 and 44 of the separation circuit 20 of FIG. 1, the separation circuits of FIGS. 3A-3D, and the separation circuit 130 of FIG. 8.
Figure 4B:
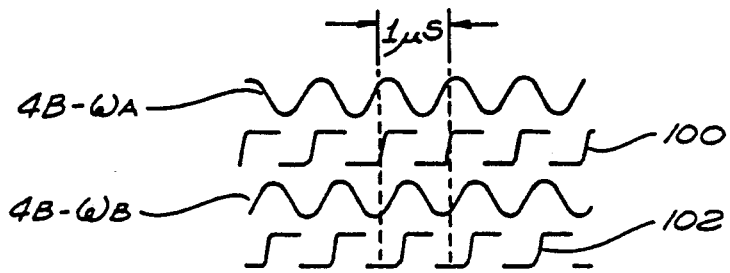
FIG. 4B shows a graphic representation of the waveforms of the output separated signals as they leave the output terminals 42 and 44 of the separation circuit 20 of FIG. 1, 3A-3D, and 8 and their digitized logic level counterparts (successfully extracted at 27 and 29) the separation circuit 20 of FIG. 1, 3A-3D, and 8.

Results are depicted in FIG. 4B showing the separated signals and their digitized counterparts (readable by the computer 60) corresponding to the input and output signals which appear in FIG. 1. Signals 4B-$W_A$ and 4B-$W_B$ appearing in FIG. 4B are the output waveforms recovered, respectively, at the output terminals 52 and 54 of FIG. 1, while their digitized counterpart, signals 100 and 102, are also shown in FIG. 4B. The digitized counterpart signals 100 and 102 appear, respectively, at the output terminals of the digitizers (level detecting comparators) 27 and 29. As stated previously these components are compared for relative frequency to obtain gyroscope rotation rate and direction. Various alternative embodiments of circuitry to achieve the $\pi/2$ radian electronic phase shift necessary to implement this technique are shown in FIGS. 3 (A) through (D) and 8.

The embodiment shown in FIG. 3A relies on the fact that if a signal is phase shifted $\pi/4$ radians in a simple RC network and half of the original signal is subtracted from this phase shifted version the result is a $\pi/2$ radian phase shift of the original signal at half of the original amplitude. Stated mathematically, we have the following:

$$(2^{\frac{1}{2}})\mathrm{SIN}(Wt - \pi/4) - \tfrac{1}{2}\mathrm{SIN}\ Wt = \tfrac{1}{2}\mathrm{SIN}(Wt - \pi/2) \quad [EQ\ 5]$$

Although $\pi/2$ radians results for only one frequency, any frequency close to W undergoes a nearly equal phase shift. For now, we will assume this pertains to $W_A$ and $W_B$ of EQ 1 through EQ 4. The photodetectors $PD_1$ and $PD_2$ convert the amplitude of the light falling on their photosensitive surfaces to an electrical current along the signal separation circuit input terminals 42 and 44, as in FIG. 1.

With reference to FIG. 3A, the outputs of each of the current-to-voltage converter 22 and 24 are provided to the inverting and noninverting input terminals of the Difference Amplifiers 64 and 66. These output signals pass through a pair of equal value resistors 72 and 74 and the RC networks (76,71) and (75,73) (each RC network being comprised, respectively, of resistor 76 combined with capacitor 71 and resistor 75 combined with capacitor 73). The combined effect of these networks is to provide a $\pi/2$ radian phase shift in the signal they deliver to their respective input terminals of difference amplifiers 64 and 66. It is known by superposition the result is one half the sum of the signals at each output. The results appearing at the difference amplifiers' outputs can be expressed as follows using the identity of EQ 5:

$$(2^{\frac{1}{2}})V_{PD1} < -\pi/4 - [(V_{PD1} + V_{PD2})/2] = \tfrac{1}{2}V_{PD1} < -\pi/2 - \tfrac{1}{2}V_{PD2} \quad [EQ\ 6]$$

$$(2^{\frac{1}{2}})V_{PD2} < -\pi/4 - [(V_{PD1} + V_{PD2})/2] = \tfrac{1}{2}V_{PD2} < -\pi/2 - \tfrac{1}{2}V_{PD1} \quad [EQ\ 7]$$

Note that both results of above EQ 6 and EQ 7 resemble the forms of EQ 3 and EQ 4. Inspecting EQ 3 and EQ 4, we see that subtracting their components (rather than adding them) will only change which component, $W_A$ or $W_B$, survives the process. In other words, separation of the frequencies is still the result. By making the appropriate substitutions we obtain for the network shown in FIG. 3A, the following results:

$$\tfrac{1}{2}(V_{PD1} < -\pi/2 - V_{PD2}) = +\cos W_B t \qquad [EQ\ 8]$$

and $$\tfrac{1}{2}(-V_{PD1} + V_{PD2} < -\pi/2) = -\sin W_A t \qquad [EQ\ 9].$$

Although the network shown at FIG. 3A appears not to be overly complex, provision should be made for adjusting two components (either resistors or capacitors) because precision capacitors are difficult to obtain.

The Signal Separation Network shown in FIG. 3B is the simplest of all. Here, rather than obtaining $\pi/2$ radians of phase shift at one of the outputs of converter 22 or 24, a $\pi/4$ radians of shift is introduced into the output of each of the converters 22 and 24. The resulting summed signals at each RC node are as follows:

$$(2^{\tfrac{1}{2}}/2)V_{PD1} < -\pi/4 + (2^{\tfrac{1}{2}}/2)V_{PD2} < +\pi/4 = 2^{\tfrac{1}{2}}\sin(-W_A t - \pi/4); \qquad [EQ\ 10]$$

and, $$(2^{\tfrac{1}{2}}/2)V_{PD1} < +\pi/4 + (2^{\tfrac{1}{2}}/2)V_{PD2} < -\pi/4 = 2^{\tfrac{1}{2}}\sin(W_B t + \pi/4). \qquad [EQ\ 11]$$

Note that the frequencies are again separated and a difference amplifier is not necessary to obtain an output. Instead, a pair of buffer amplifiers 65 and 67 may be used to further process the output signals from the separation circuitry. Tuning requires adjustment of two components (either resistors or capacitors) again, but considering its overall simplicity, FIG. 3B is a more preferred embodiment for readout signal separation. As to FIG. 3B, an output signal $V_{PD1}$ from converter 22 and $V_{PD2}$ from converter 24 are provided to a first node joining resistor 62 and capacitor 81 and to a second node joining resistor 82 and capacitor 79. Phase shifts are introduced into each set of signals (that are presented to the respective inputs of the buffer amplifiers 65 and 67) at a third node joining resistor 62 and capacitor 79 and a fourth node joining resistor 82 and capacitor 81. In this manner, the results shown in equations 10 and 11 may be achieved by the separation circuitry.

So far $W_A$ and $W_B$ have been assumed to be nearly the same frequency. As the difference in these two frequencies becomes greater (corresponding to higher gyroscope rotation rates), the outputs show greater contamination by the frequency term originally rejected. This results in amplitude modulation at the beat frequency of the two signals. The depth of modulation is different for the two outputs but generally becomes worse as the frequencies separate. It has been experimentally found that a 50% crosstalk is tolerable.

Figure 5A:
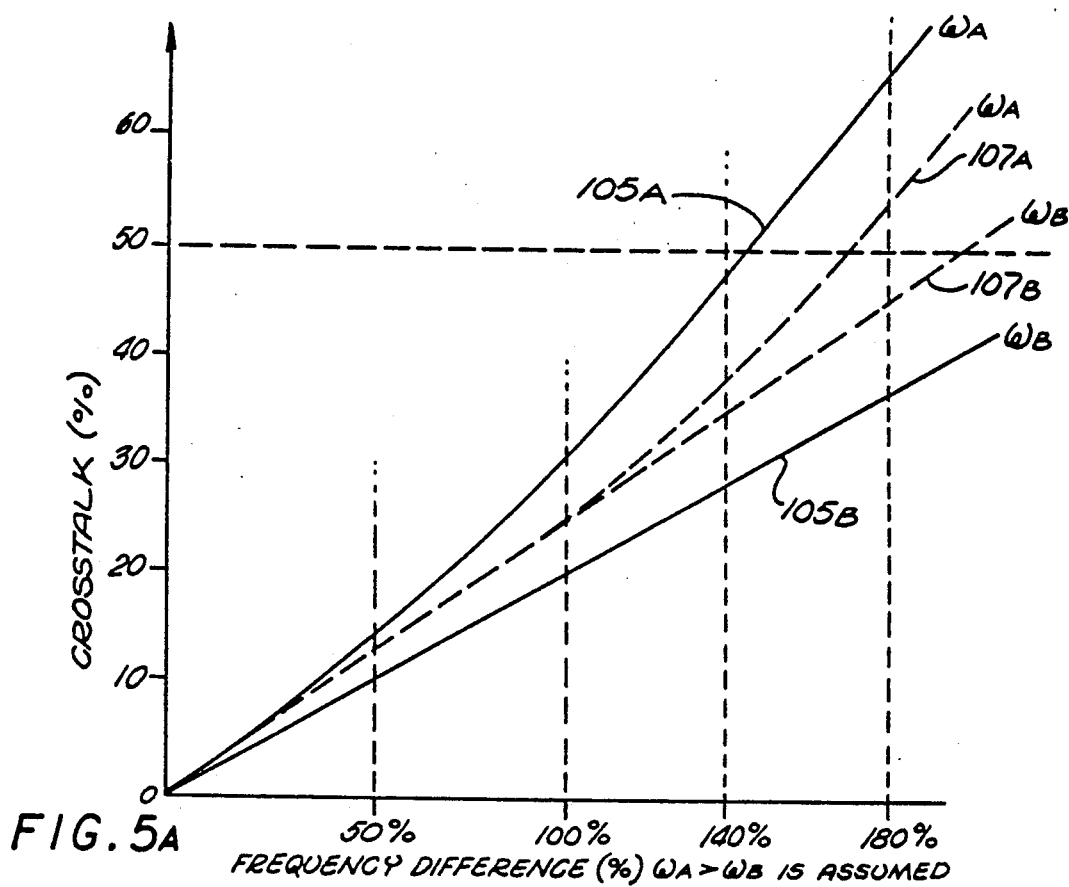
FIG. 5A shows a graph plotting of percentage of crosstalk against Percentage of Frequency Difference, illustrating that a difference between $W_A$ and $W_B$ of 140% of their zero rotation rate frequency can be tolerated.

FIG. 5A illustrates (by the Curves 105A and 105B shown as solid lines) a graph plotting the percentage of crosstalk against the percentage of frequency difference, and assumes a practical rejection limit for tolerable crosstalk to be approximately 50%. FIG. 5A shows that a difference between $W_A$ and $W_B$ of 140% of their zero rotation rate frequency can be tolerated for a $\pm \pi/2$ phase relationship between photodetector outputs. The frequency difference is expressed mathematically as:

$$(|W_A - W_B|/W_F) \times 100\%\ ;$$

where, $W_F$ is the Faraday frequency of the gyroscope instrument.

Figure 5B:
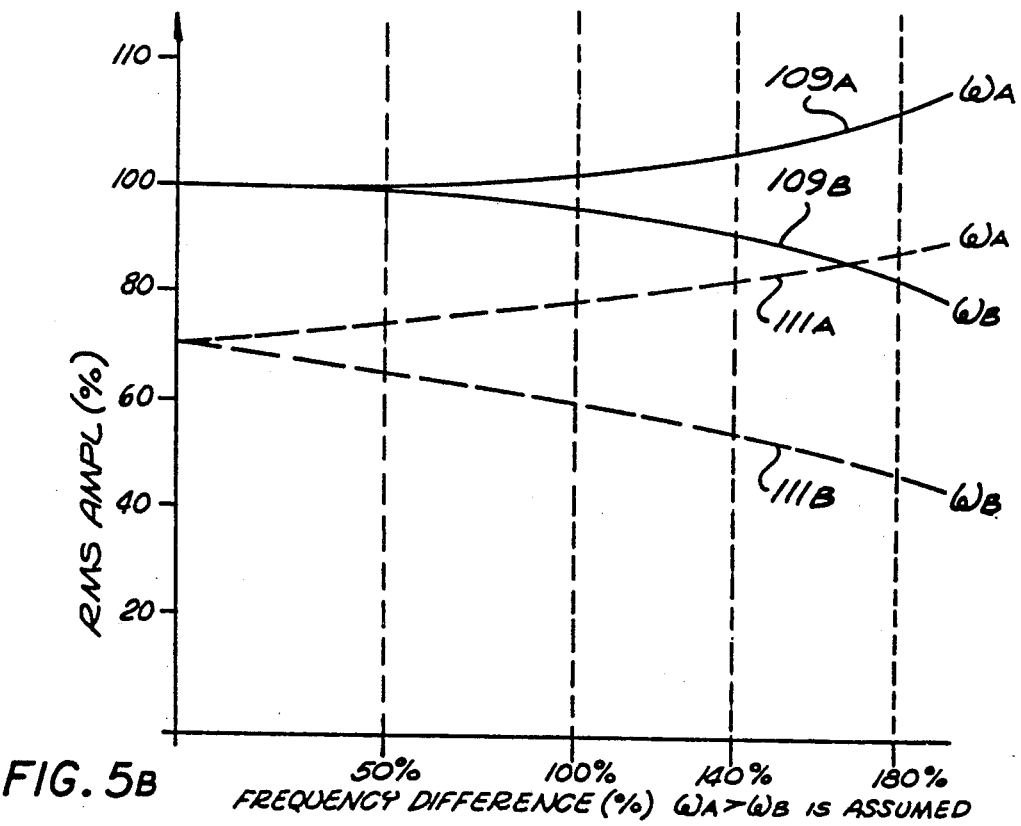
FIG. 5B shows a graph plotting signal amplitude (measured in RMS values) against percentage of Frequency Difference, illustrating that the effect of $\pm \pi/3$ instead of $\pm \pi/2$ phase relationship (by changing the alignment of the photodetectors) between the Faraday Frequencies.

FIG. 5B illustrates that the RMS amplitudes of $W_A$ and $W_B$ begin to differ after a 50% frequency difference and then rapidly diverge beyond 100%. This is shown in FIG. 5B by solid lines 109A and 109B for a $\pi/2$ radian phase shift configuration of the signal separation circuit. FIG. 5B also illustrates the trade-off inherent with using a phase shift other than $\pi/2$ radians to achieve signal separation at high rotation rates with greater crosstalk. The trade-off is that although crosstalk is reduced, an accommodation is needed for the apparent pathlength changes which arise due to operation at even low rotation rates.

Figure 4C:
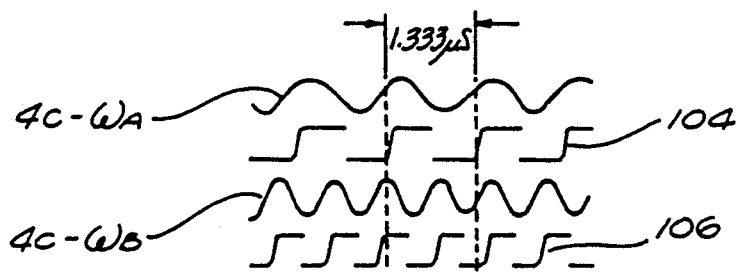
FIGS. 4C through 4E shows a graphic representation of the progression of the tolerance of crosstalk between $W_A$ and $W_B$ waveforms of the output separated signals and their digitized logic level counterparts (successfully extracted at 27 and 29), at the output terminals 52 and 54 of the separation circuit 20 of FIGS. 1.
Figure 4D:
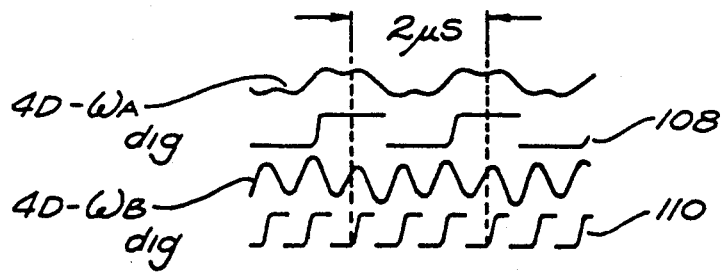
Figure 4E:
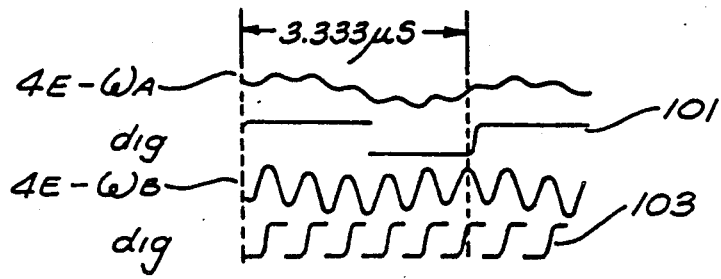

FIGS. 4C, 4D, and 4E show the progression of this crosstalk phenomenon for various frequency differences. In FIG. 4C, over a selected time period of 1.333 micro-seconds, the frequency 4C-$W_A$ (and its digitized counterpart 104) begins to show a slightly lower count for the same time period than the count shown by the frequency 4C-$W_B$ (and its digitized counterpart 106). Likewise in FIG. 4D, over a selected time period of two (2) micro-seconds, where the gyroscope is experiencing higher rotation rates, the frequency 4D-$W_A$ (and its digitized counterpart 108) begins to show a more pronounced lower count for the same time period than the count shown by the frequency 4D-$W_B$ (and its digitized counterpart 110); and, the crosstalk in frequency signal 4D-$W_A$ is beginning to be pronounced. At a significantly higher rotation rate greater than that shown in FIG. 4C, FIG. 4E shows over a selected time period of 3.333 micro-seconds, where the gyroscope is experiencing the highest of rotation rates, the frequency 4E-$W_A$ (and its digitized counterpart 101) begins to show a most significant lower count of one for the same time period than the count shown by the frequency 4E-$W_B$ (and its digitized counterpart 103) shows as approximately a count of six. Also, it should be noted that the frequency signal 4E-$W_A$ has such pronounced crosstalk that it is becoming quite difficult to distinguish cross talk from count information.

Although the crosstalk which accompanies higher rotation rates makes interpretation of the output signals from the separation circuitry more difficult, logic levels can be successfully extracted from these waveforms (as represented in the FIGS. 4B through 4E). Gyroscope operating conditions may require an even greater accommodation than the 140% frequency difference. The network shown in FIG. 3C accomplishes separation of $W_A$ and $W_B$ over approximately 180% frequency difference relative to their zero rotation rate frequency (again using the practical limit of 50% crosstalk). When compared to the network shown in FIG. 3A, the embodiment shown in FIG. 3C adds additional cross-coupling capacitors 91 and 93 which are included to cancel the unwanted signals. Adjustments of the other components (such as careful selection of the resistive network comprised of resistors 86 and 87 and the resistive network comprised of resistors 85 and 88, as well as adjustments to capacitor 89 to assure it balances the resistors 83 and 84) are useful in obtaining maximum crosstalk cancellation. In practice this tuning is an iterative process and is best accomplished with variable capacitances.

The network shown in FIG. 3D is a variation of the signal separation circuit of FIG. 3B, where the extension to 180% frequency difference (as previously defined) is accommodated. While the resistors 92 and 94 are comparable to resistors 62 and 82 of FIG. 3B, and the cross-coupled capacitors 95 and 97 may be compared to the capacitors 79 and 81, variable capacitors 61 and 63 are provided to fine tune this network shown in FIG. 3D. The tuning procedure for the circuit of FIG. 3D involves adjusting the gyroscope path length such that only an LCP or RCP line pair is lasing (see, FIG. 6). If we choose the LCP ($W_A$) pair, then the resistor 94 is varied to obtain a minimum signal for the RCP ($W_B$) channel. Next, the capacitor 63 is varied to completely null the $W_B$ channel output. The gyroscope path length is then adjusted for LCP ($W_B$) lasing. The resistor 92 is then varied to obtain a minimum on the $W_A$ channel and the variable capacitor 61 is used to null the output completely. A non-rotating gyroscope is assumed for the above procedure. The photodetectors may be aligned to create a phase relationship of approximately $\pm \pi/3$ instead of $\pm \pi/2$ as defined in EQ 2. These results (using the circuit shown in FIG. 3D) are illustrated by dashed curves 107A and 107B in FIG. 5A and dashed curves 11A and 111B in FIG. 5B. Notice that the high frequency crosstalk content of the $W_A$ channel is improved, while the crosstalk of the lower frequency channel $W_B$ is raised. A more favorable crosstalk condition is achieved when the phase relationship is $\pi/3$ compared to the $\pi/2$ radian phase shift embodiment, because neither $W_A$ nor $W_B$ exhibit 50% crosstalk until the frequency difference exceeds 180%. The compromises made in utilizing this approach include somewhat lower signal amplitudes (assuming the same photocurrent magnitudes for both cases) and a greater spread in RMS amplitudes at lower frequencies (but still zero at the 0% frequency difference condition).

Similar compromises result from extracting a 180% frequency difference using the network of FIG. 3C, (recall that it is not necessary to use the $\pm \pi/3$ photodetector alignment in this FIG. 3C circuit). In this manner, one may achieve results substantially similar to that achieved by use of the $\pi/3$ radian embodiment of FIG. 3D.

It is evident from the last two circuit examples (FIGS. 3C and 3D) that if an unintentional photodetector misalignment should occur in gyroscope assembly, the various R and C values in these networks could be tuned to cancel any crosstalk which might result. It can also be shown that for frequency differences other than 0%, a complete nulling of crosstalk can be achieved by dynamically tuning components (either resistors or capacitors) in the last two networks [FIGS. 3C and 3D].

Figure 5C:
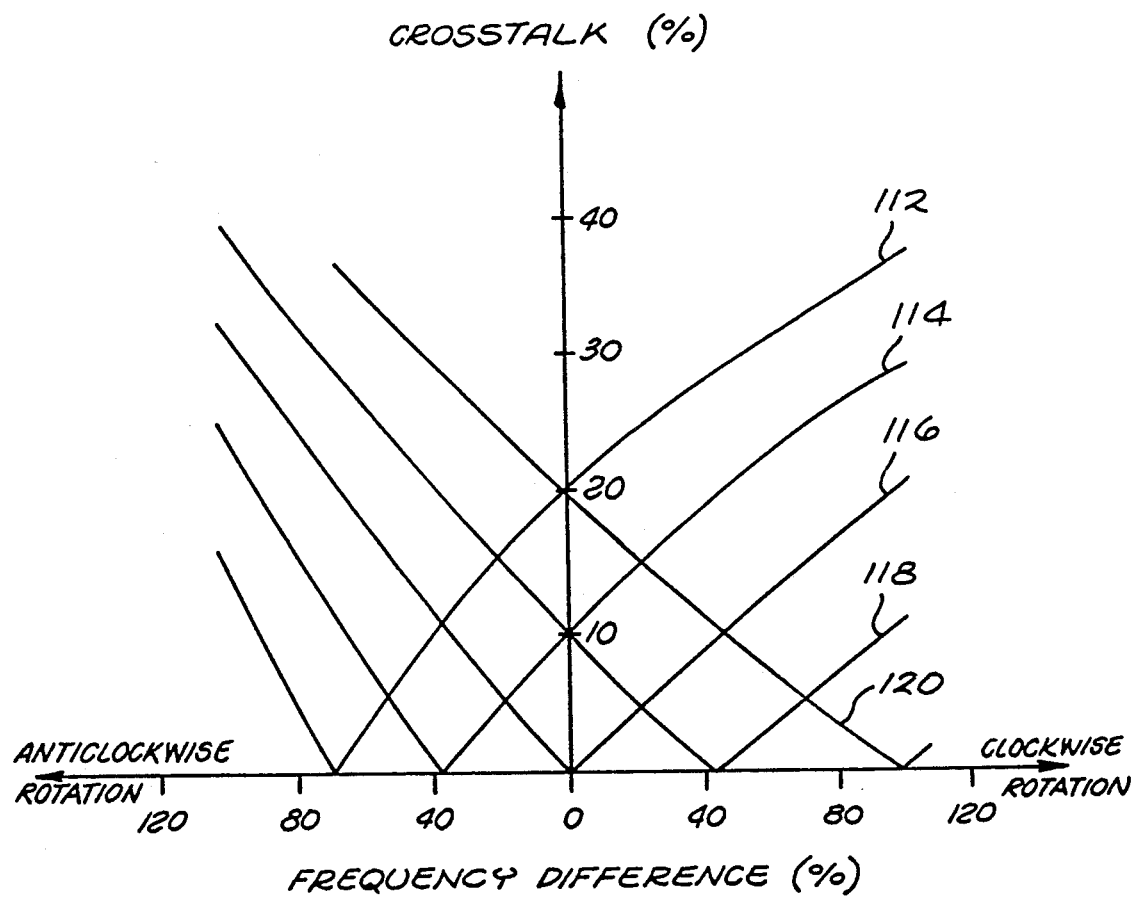
FIG. 5C is a graph plotting Percentage of Crosstalk against Clockwise and Anticlockwise Percentage of Frequency Difference between the Sagnac effect modulated Faraday Frequencies, illustrating what happens when crosstalk cancellation at other frequency differences is obtained. A family of curves 112, 114, 116, 118, and 120 show variations in sensitivity to frequency difference, where nulling of unwanted signal components is limited only by the tuning range of the network Resistive and Capacitive values.

FIG. 5C shows what happens when crosstalk cancellation at other frequency differences is obtained. The family of curves (112, 114, 116, 118, and 120) displayed in FIG. 5C show variations in sensitivity to frequency difference. The relationship of sensitivity to frequency difference is somewhat complex, but nulling of unwanted signal components is limited only by the tuning range of the network resistive and capacitive values. At zero rotation rate, for example, a gyroscope would exhibit the characteristic shown by curve 116. Perfect crosstalk cancellation could take place over more than a 180% frequency difference making nearly the full Faraday frequency limit of the gyroscope accessible. A compromise that is a required, in order to dynamically tune network components, is to tune such components at a rate comparable with the maximum angular acceleration the instrument will experience in operation. The Signal Separation Network of FIG. 8 shows one possible embodiment. All tuning, including any made necessary by photodetector misalignment, could be accomplished by such a computer controlled network. All adjustments would be made while monitoring the network outputs to obtain rate information. Various predictive filtering algorithms could be used to enhance response to angular acceleration.

Figure 8:
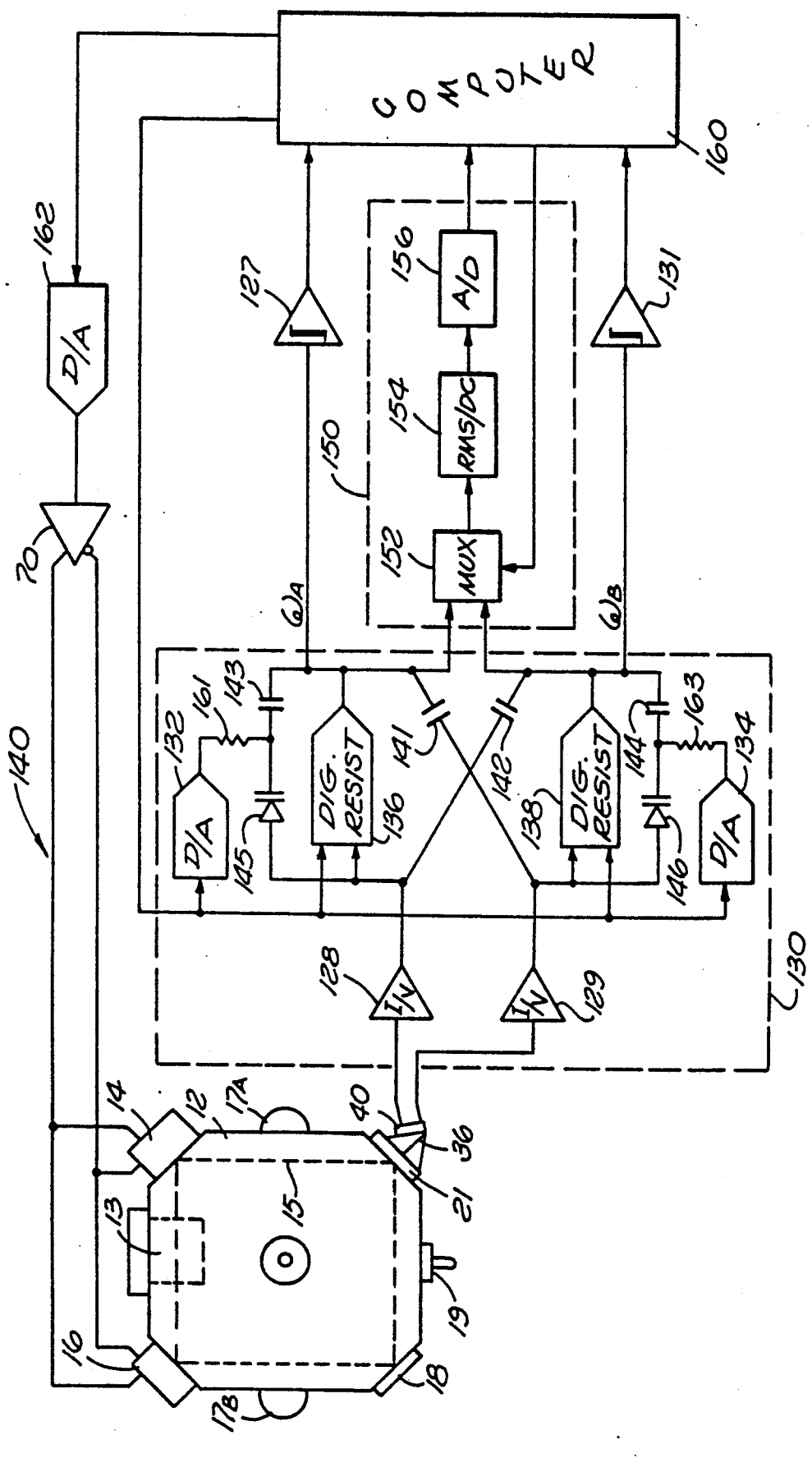
FIG. 8 is a schematic diagram of an alternative embodiment of the output optics detection and cavity length control system of this invention, showing a dynamically tuned network through the use of digitally controlled phase shifting circuits, operating to selectively adjust the suppressed carrier modulation electronic output signals for wider bandwidth operation of the rotation sensing and pathlength control circuitry.

FIG. 8 operates initially in a manner similar to FIG. 1, but provides a dynamically tunable alternative embodiment. The output signals from the photodetectors 40 provide currents for conversion to voltage signals by the converters 12 and 129. These converters provide a pair of signals to one each of the input terminals of the digitally controlled resistive elements 136 and 138. The Model No. X9MME digitally controlled potentiometer manufactured by Xicor Inc., of Milpitas, Calif. 95035 is an example of the preferred digitally controlled resistive element envisioned by the circuit design shown in FIG. 8. Alternatively, but in a configuration different than the circuitry shown in FIG. 8, these components may be R-2R Ladder Networks such as the CMOS MICRODACs# family of 8, 10 and 12-bit Digital to Analog converters as manufactured by National Semiconductor Corporation of Santa Clara, Calif. (Models DAC1208, DAC1209, DAC1210, DAC1230, DAC1231, and DAC1232). These resistive elements, 136 and 138, operate in a manner similar to the resistors 92 and 94 of the circuit configuration shown in FIG. 3D; except in FIG. 8 the values are controlled by the computer 160. Similarly, the varactors 145 and 146 with their associated D/A converters 132 and 134, operate in a manner similar to the capacitors 61 and 63 of the circuit in FIG. 3D; and in FIG. 8 the values are again controlled by the computer 160. Cross-coupling capacitors 141 and 142 provide the same function in FIG. 8 as do capacitors 95 and 97 in FIG. 3D. The fixed capacitors 143 and 144 act to prevent DC levels from being delivered to the digitizer comparators 127 and 131. The function of resistors 161 and 163 is to prevent loading of the output signal $W_A$ and $W_B$ by the D/A converters 132, 134.

Theoretically the signal separation circuitry 130 could be dynamically tuned for minimum crosstalk content in $W_A$ and $W_B$ at any rotation rate the gyroscope is designed for. This might be done by alternately monitoring the RMS output of the signal separation circuitry 130 using the sampling and A/D conversion circuitry 150. The computer 160 would then transmit control signals to update the signal separator 130 variable components, 136, 138, 145, and 146, as the rotation rate of the gyroscope changes. In practice this only could be done for low angular accelerations due to the long intervals required to sample $W_A$ and $W_B$ by the network 150 and the computer 160. This is necessary to evaluate the sampled data and transmit corrections to the signal separation network 130. A more practical scheme involves a series of calibrations for the gyroscope at various known rates of rotation with experimentally determined values for the resistive elements (136, 138) and varactors (145, 146). Appropriate corrections to the output RMS values of $W_A$ and $W_B$ for various rotation rates would also be obtained during the calibrations (such as the curves shown in FIG. 5B). When the gyroscope is in actual use these values would be accessible to the computer as a calibration table for updating tuning components as a function of the rate information being derived from the gyroscope instrument. In this manner, a nearly real time computer controlled retuning of the signal separation circuitry 130 can be achieved.

Circuits other than those shown in FIGS. 3A through 3D and FIG. 8 which maintain a $\pi/2$ phase shift over a much wider bandwidth could be used to perform a signal separation. The techniques explored involve stagger-tuned cascaded phase shifters and multiple feedback amplifiers. Also integrators or differentiators followed by gain control would work. Such approaches are considerably more involved regarding component count and tolerance requirements, and are not amenable to adjustment should the photodetector be misaligned (a situation which produces phase shifts other than $\pi/2$). Low rate crosstalk cancellation involves tuning numerous interactive component values in these circuits to obtain the phase shift required for elimination of the unwanted components that such misalignment induces. This is the major disadvantage of all such wideband phase shift networks and becomes critical for pathlength control which is discussed below.

In addition to providing a system for ring laser gyroscope rotation sensing, a pathlength control servo-loop system is taught herein. As noted earlier, the waveforms derived from the readout signal separation circuitry are sine waves of frequencies designated $W_A$ and $W_B$. The object of the servo-loop is to maintain a constant amplitude relationship between these two signals; the normal operating point is with nearly equal amplitudes. A method for determining relative amplitudes is to use a simple diode detector or an RMS/DC converter to sample or continuously monitor the individual channels corresponding to $W_A$ and $W_B$.

FIG. 1 shows such an implementation. The error determining circuit 50 operates to provide the initial information needed for cavity or path length control (PLC). Root Mean Squared values of the AC signal amplitudes for the frequencies $W_A$ and $W_B$ are converted to DC levels by the RMS to DC converters 56 and 58. The two output amplitudes from converters 56 and 58 are compared by means of a difference amplifier 57, having an output signal which constitutes the pathlength control (PLC) error signal. This error signal is then input to an integrator 59, the output of which is amplified by the PZT drive amplifier 70 to levels suitable for driving the gyroscope path length adjustment mirror assemblies 14 and 16 (which contain a PZT (piezoelectric transducer) ceramic material).

FIG. 8 presents an alternative implementation of cavity length control. Dedicated circuitry (as shown in FIG. 1 and described hereinbefore) need not be provided to produce the error signal, since a computer is an alternate means of closing the path length loop. FIG. 8 shows an implementation of cavity length control circuitry 150 where signal amplitudes ($W_A$ and $W_B$) are alternately sampled by using a single RMS-to-DC converter 154 with appropriate multiplexing (such as by multiplexer 152) between the two signals. The output of the RMS/DC converter 154 would pass through an analog-to-digital converter 156 to produce a computer readable output error signal. Software in the computer 160 would perform amplitude comparisons and integration of the calculated error value according to methods of computer programming known to a programmer with ordinary skill in the art of programming servoloop controllers. The calculated error value would be converted back to an analog signal by the digital-to-analog converter 162, empowering the PZT drive amplifier to drive the PZT mirrors 14 and 16 and produce a mirror adjustment.

If crosstalk is present on either channel ($W_A$ and $W_B$) amplitude measurements and their comparisons produce an amplitude modulation of the path length control error signal at the difference frequency of $W_A$ and $W_B$.

The magnitude of this modulation is directly proportional to the combined percentage of crosstalk on the signals and the relative phase of the modulations on individual channels. If the frequency difference between $W_A$ and $W_B$ is small, it may fall within the loop bandwidth of the path length control function. In this case, the mirror adjustment will follow amplitude modulation of the error signal. (Under some circumstances this may be objectionable so crosstalk cancellation at low gyroscope rotation rates is critical.) Adaptive filtering of the error signal can be accommodated in a computer implementation of this loop (such as the implementation shown in FIG. 8 previously discussed). Updates of the mirror position would depend on the beat note frequency between $W_A$ and $W_B$. Beat note modulation of the error signal also becomes apparent when the gyroscope Faraday bias frequency ($W_F$) is a harmonic of the frequency difference between $W_A$ and $W_B$. Under such circumstances a dynamically tunable embodiment of the signal separation circuitry (such as shown in FIG. 8) becomes useful. This embodiment is tuned by computer control and is responsive to rotation rate. Both crosstalk and pathlength are tuned. In practice, systems using a gyroscope are seldom prone to dwelling at subharmonics of the Faraday bias frequency long enough to disturb the path length control servo-loop. A computer controlled servo-loop could either command a retuning of signal separator to null the cross talk, adaptively filter the error signal, or simply not update the loop during excursions through such harmonic or low rate regions.

Figure 7:
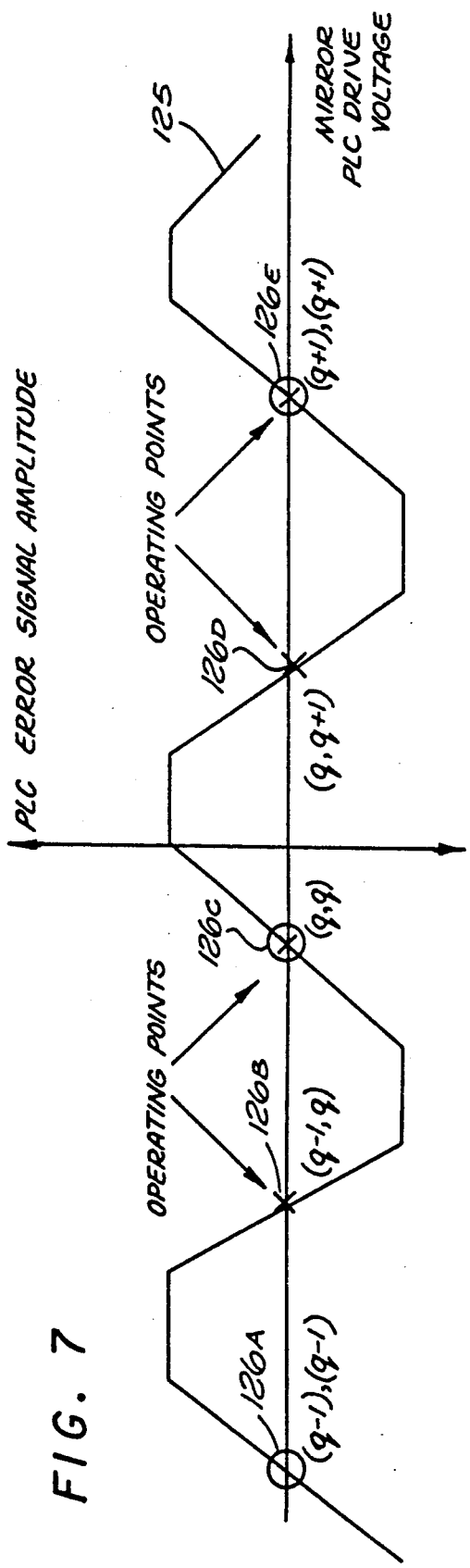
FIG. 7 is a graphic illustration of the longitudinal modes of the resonator cavity plotted against path length control signal amplitude showing a near-linear relationship between relative sine wave amplitudes and the offset from the desired operating point 126A-126E.

Turning now to FIG. 7, it is shown along Curve 125 that there is a near-linear relationship between relative sine wave amplitudes and offset from the desired operating points. There are two possible sets of operating points (a first set 126B and 126C and a second set 126D and 126E, each set exhibiting different slopes) which could be selectable. In most applications only one slope through an operating point (the set of 126B, 126D or the set of 126C, 126E) is used for a particular instrument. (Point 126A may be an operating point, but for this example is not an optimum operating point.)

FIG. 6 shows the relationship between the various operating points and readout signals with respect to the associated laser gain curve. One can envision gyroscope cavity resonances, such as curves 122 and 124 (q,q and q, q+1), moving in response to the gyroscope pathlength mirrors so as to straddle the doppler broaden gain curve. When these cavity resonances have equal gain the gyroscopes are tuned to their operating point; that is, the right circularly polarized (RCP) and left circularly polarized (LCP) components of the counter propagating beams (clockwise [C] and anti-clockwise [A]) have equal intensities at the gyroscope output mirror. The beat notes produced by the combined beams correspond to $W_A$ and $W_B$ as shown in FIG. 6. The set of lines labeled q, or q+1 represents the longitudinal mode number (or the number of wavelengths of laser light that can occupy the cavity at resonance). For a 32 cm cavity operating at a He—Ne wavelength of 633 nM, q is about 500 000. If the line pairs of q mode move to the right of gain center in FIG. 6, the $W_A$ component grows larger by nearly the amount $W_B$ grows smaller. Opposite movement produces a complimentary result.

FIG. 7 shows the desired operating point (q, q) and how the difference in amplitudes of $W_A$ and $W_B$ would look as path length mirror control voltage is varied. This is referred to this as the path length error signal. If the line pairs move far enough eventually only one pair (RCP corresponding to $W_A$ or LCP corresponding to $W_B$) will lase. The line pair which is still producing light traces out an intensity profile representative of the rounded peak of the gain curve. This nearly flat intensity profile shows as level maximums and minimums in the path length error signal. As the movement of line pairs progresses it becomes possible for q+1 mode lines to lase. When a mix of q and q+1 light is produced the error signal slope reverses. If the spacing between q,q pairs and q,q+1 is the same, the slopes are equal but opposite in sign. If q,q and q,q+1 are not spaced equally then the slope steepness will be different as well.

Thus, there has been disclosed a ring laser gyroscope rotational sensing system and cavity length control system for a multioscillator ring laser gyroscope that can operate with a simple prism scheme where the required signal separation is performed fully electronically. While a preferred embodiment and alternative systems for performing rotation sensing and pathlength control have been disclosed, it can be seen that other equivalent alternative embodiments may also be apparent. For example, where capacitors were adjustable in the embodiments shown in FIGS. 3C, 3D, and 8, resistive elements could have alternatively been adjustable to achieve the same result of retuning the RC networks contained within these systems. Thus, it is apparent that the appended claims which follow are intended to cover not only the embodiments described in this application, but alternative equivalents as well.

What is claimed is:

1. In a ring laser gyroscope rotational sensing system, an output optics detection system comprising:
   an output prism, affixed to an output mirror of a ring resonator cavity of a ring laser gyroscope, suitable for heterodyning multiple frequency optical signals, said signals being grouped into pairs, each pair of signals having a clockwise component and an anti-clockwise component,
   a photo-electronic transducer means;
   said prism producing a heterodyned carrier optical output signal which is a function of a Sagnac Effect modulated Faraday biased beat frequency signal, in the form of a double side band suppressed carrier output signal, electronically detectable by said photo electronic transducer means;
   signal separation means for processing an electronic output signal corresponding to said double side band suppressed carrier output signal from said photo-electronic transducer means, said output signal being a function of said Sagnac Effect modulated Faraday biased beat frequency signal;
   whereby, the Sagnac Effect modulated Faraday biased beat frequency signal is electronically separated into its components in order to measure rotational rate and direction.

2. The ring laser gyroscope rotational sensing system of claim 1, including:
   cavity length control circuitry means, operatively associated with said signal separation means, for controlling the resonance of a signal within said ring resonator cavity of said ring laser gyroscope.

3. The ring laser gyroscope rotational sensing system of claim 2,
   wherein, the cavity length control circuitry means includes: broadband signal processing means for maintaining a proper cavity length operating point over a wide range of gyroscope rotation rates;
   said broadband signal processing means predicting behavior of relative amplitudes of the separated signals over a predetermined maximum frequency range, which range approaches a theoretical maximum rotation rate of the instrument.

4. The ring laser gyroscope rotational sensing system of claim 3, wherein, the cavity length control circuitry means includes:
   means for further reduction of the effect of crosstalk on a pathlength error signal, when gyroscope operation occurs near zero rotation rate, as said gyroscope operation relates to a cavity length servomechanism.

5. The ring laser gyroscope rotational sensing system of claim 2, wherein:
   said cavity length control circuitry means, operatively associated with said signal separation means, for controlling signal resonance within said ring resonator cavity of said ring laser gyroscope includes:
   means for detecting a time-averaged magnitude value for each of said separated component output signals, said detecting means providing said magnitude values to a difference amplifier means, said difference amplifier means providing an output error signal;
   means for integrating said output error signal from said difference amplifier, forming a servo-loop and feeding an integrated error signal to at least one piezo-electric transducer at a level sufficient to drive said piezo-electric transducer, whereby said cavity length may be adjusted.

6. The ring laser gyroscope rotational sensing system of claim 2, wherein:
   said cavity length control circuitry means, operatively associated with said signal separation means, for controlling signal resonance within said ring resonator cavity of said ring laser gyroscope includes:
   means for detecting a time-averaged magnitude value for each of said separated component output signals, said detecting means providing said magnitude values to a difference amplifier means, said difference amplifier means providing an output error signal;
   means for integrating said output error signal from said difference amplifier, said integrating means feeding an integrated error signal to at least one piezo-electric transducer at a level sufficient to drive said piezo-electric transducer, whereby said cavity length may be adjusted.

7. The ring laser gyroscope rotational sensing system of claim 1, wherein:
   said photo-electronic transducer means includes a set of at least two photodetectors separated a predetermined phasor distance apart, providing said double side band suppressed carrier output signal; and, said signal separation means for processing said double side band suppressed carrier output signal includes:

a set of at least two phase shifter circuits, one of each of said at least two phase shifter circuits operatively associated with one of each of said at least two photodetectors, each of said phase shift circuits operating to phase shift said double side band suppressed carrier output signal;

a set of at least two combining circuits, one of each combining circuit combining a first double side band suppressed carrier output signal from a first photodetector with a phase-shifted second double side band suppressed carrier output signal from a second photodetector; and, a second of said at least two combining circuits combining a second double side band suppressed carrier output signal from a second photodetector with a phase-shifted first double side band suppressed carrier output signal from a first photodetector;

whereby said double side band suppressed carrier modulation signal from said photo-electronic transducer means is electronically separated into two component output signals, corresponding to each of the Sagnac effect modulated Faraday biased beat frequency signals, in order to measure rotational rate and direction.

8. The ring laser gyroscope rotational sensing system of claim 7, wherein said signal separation means further comprising:

said set of at least two phase shifter circuits includes:

two RC networks, operatively associated with a common voltage divider network, each of said RC networks connected in series to one input of each of the combining circuits; and, said combining circuits being differential amplifiers; whereby, an first input signal to said signal separation means is phase shifted $\pi/4$ radians in a first of said RC networks, and a second input signal to said signal separation means is phase shifted $\pi/4$ radians in a second of said RC networks, half of each of the first and second input signals being subtracted from said phase shifted $\pi/4$ version at said differential amplifiers, resulting in a $\pi/2$ radian phase shift of the first input signal at half of the first input signal's amplitude and a $\pi/2$ radian phase shift of the second input signal at half of the second input signal's amplitude; said first and second input signals being separated into their respective components allowing determination of gyroscope rotation and rotational direction.

9. The ring laser gyroscope rotational sensing system of claim 8, wherein:

said two RC networks are operatively associated with both said common voltage divider network and cross coupled capacitors:

whereby, said cross coupled capacitors and said common voltage divider network are useful in obtaining maximum crosstalk cancellation by achieving cancellation of unwanted signals over a wide range of signal crosstalk.

10. The ring laser gyroscope rotational sensing system of claim 7, wherein said signal separation means further comprising: said set of at least two phase shifter circuits includes:

two RC networks, each RC network, being operatively associated with both of said photodetectors,
each of said RC networks cross coupled to one another and, each of said RC networks connected in series to one input of each of the combining circuits; and said combining circuits being buffer amplifiers;

whereby, an first input signal to said signal separation means is phase shifted by a $\pi/4$ radians lead by a first and second of said RC networks, and a second input signal to said signal separation means is phase shifted by a $\pi/4$ radians lag by said first and second of said RC networks; $\pi/2$ radians of shift being the resultant phase shift introduced into each of a first and second buffer amplifier input signals; said first and second buffer input signals being separated into their respective components allowing determination of gyroscope rotation and rotational direction.

11. The ring laser gyroscope rotational sensing system of claim 10, wherein:

an adjustable capacitor is operatively associated with each of said RC networks; whereby, said RC networks, formed by said capacitor and associated resistive components, may be iteratively tuned to obtain the desired unwanted signal cancellation over an extended range of up to 180% frequency difference between said input signals.

12. The ring laser gyroscope rotational sensing system of claim 10, wherein:

an adjustable capacitor is operatively associated with each of said RC networks; whereby, said RC networks may be iteratively tuned to obtain the desired unwanted signal cancellation over an extended range of up to 180% frequency difference between said input signals.

13. The ring laser gyroscope rotational sensing system of claim 7, wherein:

said two photodetectors of said photo-electronic transducer means are positioned in tandem on the same side of said output prism for detecting the heterodyned carrier optical output signal.

14. The ring laser gyroscope rotational sensing system of claim 7, wherein:

said tow photodetectors of said photo-electronic transducer means are positioned on opposite sides of said output prism for detecting the heterodyned carrier optical output signal.

15. The ring laser gyroscope rotational sensing system of claim 7, wherein:

said two photodetectors of said photo-electronic transducer means are positioned on opposite sides of said output prism, each photodetector being operatively associated with one current-to-voltage converter of a set of current-to-voltage converters, each current-to-voltage converter being in close proximity to each of said photodetectors, for detecting the heterodyned carrier optical output signal.

16. The ring laser gyroscope rotational sensing system of claim 1, wherein:

said photo-electronic transducer means includes a set of at least two photodetector separated a predetermined phasor distance apart, providing said double side band suppressed carrier output signal; and, said signal separation means for processing said double side band suppressed carrier output signal includes:

a set of at least two digitally controlled phase shifting circuits, one of each of said at least two digitally controlled phase shifting circuits operatively associated with one of each of said at least two photodetectors, each one of said digitally controlled phase shifting circuits operating to selectively adjust a first and a second double side band suppressed carrier output signal;

said digitally controlled phase shifting circuits selectively adjusting said first and second double side band suppressed carrier output signals according to an integrated error signal output from a cavity length control circuitry means, operatively associated with said signal separation means;

whereby two component output signals, corresponding to each of the Sagnac effect modulated Faraday biased beat frequency signals, in order to measure rotational rate and direction, are derived which are adaptively filtered by said digitally controlled phase shifting circuits in order to avoid crosstalk with said integrated error signal output from said cavity length control circuitry means.

17. The ring laser gyroscope rotational sensing system of claim 16, including:
cavity length control circuitry means, operatively associated with said signal separation means, for controlling signal resonance within said ring resonator cavity of said ring laser gyroscope further comprising:
means for multiplexing two separated component output signals from said digitally controlled phase shifting circuits;
means for detecting a time-averaged magnitude values for each of said separated component output signals, said detecting means providing said magnitude values to an analog-to-digital converter means, said an analog-to-digital converter means providing an error signal to a computer;
said computer digitally processing said error signal from said analog-to-digital converter means, forming a servo loop, and feeding, through a digital-to-analog converter means, a first digitally processed output error signal to at least one piezo-electric transducer, at a level sufficient to drive said piezo-electric transducer; said computer also feeding a second digitally processed output error signal from said computer directly to each of said digitally controlled phase shifting circuits, whereby said cavity length may be adjusted and signal separation and rotation measurement achieved avoiding crosstalk between said signal separation means and said cavity length control circuitry means.

18. The ring laser gyroscope rotational sensing system of claim 1, wherein:
said photo-electronic transducer means includes a set of at least two photodetector separated a predetermined phasor distance apart, providing said double side band suppressed carrier output signal; and,
said signal separation means for processing said double side band suppressed carrier output signal includes:
a set of at least two digitally controlled phase shifting circuits, one of each of said at least two digitally controlled phase shifting circuits operatively associated with one of each of said at least two photodetectors, each one of said digitally controlled phase shifting circuits operating to selectively adjust a first and a second double side band suppressed carrier output signal;
said digitally controlled phase shifting circuits selectively adjusting said first and second double side band suppressed carrier output signals according to an integrated error signal output from a cavity length control circuitry means, operatively associated with said signal separation means;

whereby two component output signals for measuring rotational rate and direction, are derived which are adaptively filtered by said digitally controlled phase shifting circuits in order to avoid crosstalk with said integrated error signal output from said cavity length control circuitry means.

19. The ring laser gyroscope rotational sensing system of claim 18, including:
cavity length control circuitry means, operatively associated with said signal separation means, for controlling signal resonance within said ring resonator cavity of said ring laser gyroscope further comprising:
means for multiplexing two separated component output signals from said digitally controlled phase shifting circuits;
means for detecting a time-averaged magnitude values for each of said separated component output signals, said detecting means providing said magnitude values to an analog-to-digital converter means, said an analog-to-digital converter means providing an error signal to a computer;
said computer digitally processing said error signal from said analog-to-digital converter means, and feeding, through a digital-to-analog converter means, a first digitally processed output error signal to at least one piezo-electric transducer; said computer also feeding a second digitally processed output error signal from said computer directly to each of said digitally controlled phase shifting circuits, whereby said cavity length may be adjusted and signal separation and rotation measurement achieved avoiding crosstalk between said signal separation means and said cavity length control circuitry means.

20. A method for output optics detection in a ring laser gyroscope rotational sensing system, comprising the steps of:
heterodyning multiple frequency optical signals in the form of double side band suppressed carrier output signals, by using an output prism, affixed to an output mirror of a ring resonator cavity of a ring laser gyroscope, said signals being grouped into pairs, each pair of signals having a clockwise component and an anti-clockwise component,
converting said optical signals to electronic signals by use of a pair of photo-electronic transducers;
separating said optical signals by processing said optical signals through signal separation circuitry, producing an electronic output signal corresponding to said double side band suppressed carrier output signals where said output signal is a function of a Sagnac effect modulated Faraday biased beat frequency signal;
whereby, the Sagnac effect modulated Faraday biased beat frequency signal is electronically separated into its components in order to measure rotational rate and direction.

21. The method for output optics detection in a ring laser gyroscope rotational sensing system of claim 20, including the step of:
controlling the cavity length of the ring laser gyroscope, including feeding back cavity length drive signals to piezo-electric elements located on a plurality of mirrors of the ring laser gyroscope, which cavity length drive signals are derived from the separation of the double side band suppressed carrier output signals by the signal separation circuitry.

* * * * *